United States Patent Office 2,836,633
Patented May 27, 1958

2,836,633

NUCLEAR ALKYLATION OF CERTAIN AROMATIC HYDROCARBONS WITH ALKALI METALS AS CATALYSTS

Donald L. Esmay, Munster, Peter Fotis, Jr., Highland, and Carl E. Johnson, Griffith, Ind., assignors to Standard Oil Company, Chicago, Ill., a corporation of Indiana No Drawing. Application September 30, 1954
Serial No. 459,554

17 Claims. (Cl. 260—671)

This invention relates to a process for the introduction of one or more alkyl radicals into benzene or to their attachment to a nuclear carbon atom of an alkylatable tertiary alkylbenzene by catalytic reaction with ethylene, said alkyl radicals containing two carbon atoms or a multiple thereof.

One object of our invention is to provide a catalytic process for the reaction of ethylene with aromatic hydrocarbons such as benzene or alkylatable tertiary alkylbenzenes to produce nuclear alkylated derivatives of said aromatic hydrocarbons. Another object is to provide novel catalysts for effecting the alkylation of benzene and nucler C-alkylation of alkylatable tertiary alkylbenzenes. A further object is to provide a process for introducing an ethyl radical, or an alkyl radical which is a multiple of an ethyl radical, into benzene or an alkylatable benzene which is substituted by one or more tertiary saturated hydrocarbon radicals. An additional object of our invention is to provide means for greatly increasing the desired catalytic activity of the catalytic metals which are employed for effectuating the purposes of the present invention. The foregoing and other objects and advantages of our invention will become apparent from the ensuing description thereof.

Briefly, the present invention provides a process for introducing alkyl radicals containing two carbon atoms or a multiple of two carbon atoms into a benzenoid hydrocarbon at a nuclear position thereof by effecting contacting of ethylene, a catalyst and benzene or benzene substituted by one or more tertiary saturated hydrocarbon radicals under suitable alkylating conditions of time, temperature, ethylene:aromatic hydrocarbon mol ratio, catalyst concentration, etc. The novel catalysts which we employ for effecting said alkylation are alkali metals, which may be employed alone, but are preferably employed in conjunction with certain activated alumina adsorbents or an activated carbon such as activated coconut charcoal. The specific operating variables to be selected in conducting any given alkylation operation within the scope of our invention depend upon the degree of alkylation which is sought, desired extent of conversion, etc., and the selection of these variables is to some extent governed by such considerations as the activity of the particular alkali metal which is selected for use, the physical form of the alkali metal catalyst, the surface:weight ratio of said alkali metal catalyst, whether or not the alkali metal catalyst is employed in conjunction with an activated carbon or alumina-type adsorbent, the selected temperature, pressure, reaction period, etc. In general, however, it may be said that the over-all broad operating ranges for processes encompassed within the scope of our invention are temperatures of about 50° C. to about 350° C. and ethylene partial pressures ranging from 15 p. s. i. to the practical operating limit of the equipment, for example, 10,000 p. s. i., 20,000 p. s. i., or even more.

Usually the ethylene partial pressure within the alkylation reaction zone at the selected alkylation reaction temperature will lie between about 500 and about 5000 p. s. i., quite often in the range of about 1000 to about 2000 p. s. i. The selected reaction period may range upwardly from about one-half hour in batch reaction equipment and may be as much as 25 hours, 40 hours, or, in extreme cases, even longer, although ordinarily it will fall within the range of about 1 to about 25 hours, for example 10 hours. The proportion of alkali metal catalyst may range from about 0.01 to about 5 gram atoms per mol of the aromatic hydrocarbon feed stock or, in instances where extremely high reaction rates are desired, may be even larger. Usually, we employ between about 0.02 and about 0.1 gram atom of alkali metal per gram mol of the aromatic hydrocarbon feed stock.

By the process of the present invention it is feasible to convert a mixture of benzene and ethylene in high ultimate yields to ethylbenzene, 2-phenylbutane, 3-phenyl-3-methylpentane, and the like. The corresponding alkyl groups may be introduced by this process into alkylatable benzenes substituted by one or more tertiary saturated hydrocarbon groups, viz. t-alkyl or t-cycloalkyl groups. When reference is made herein to tertiary alkyl radicals or tertiary saturated hydrocarbon radicals, one carbon atom of the radicals thus described is attached to a nuclear carbon atom of the benzene nucleus and the remaining three valence bonds of said carbon atom are joined to other carbon atoms of a group lacking ethylenic unsaturation, e. g., an alkyl, cycloalkyl or aryl group.

The catalysts employed for the purposes of the present invention are alkali metals or their mixtures, although some alloys of alkali metals, for example, a sodium-lead alloy such as $PbNa_4$, may sometimes be employed. The alkali metal can be employed in various physical forms, shapes and sizes, for example, as chunks, pellets, wire, ribbons, turnings, thin films of alkali metals on an inert support such as quartz, and the like. In a catalytic process of the type described herein, one object of successful commercial practice is a relatively high reaction rate at a relatively low temperature. This objective can be achieved by maximizing the surface of a given weight of alkali metal catalyst. Thus, a finely divided dispersion of colloidal or near-colloidal size alkali metal, for example, sodium, can readily be prepared by means known in the art, the liquid dispersing medium being a hydrocarbon or mixture of hydrocarbons which is or are chemically unreactive in the alkylation zone, particularly a liquid saturated hydrocarbon, for example, a mineral white oil or the like.

Another means for greatly increasing the surface:weight ratio of an alkali metal is to provide a relatively thin coating thereof upon a solid supporting material which has a large surface:weight ratio. We have made the remarkable discovery, however, that not all solid supports for alkali metals are suitable for effectuating the purposes of our invention. Apparently specific surface effects of various solid supporting materials come into operation and affect the catalytic activity of the alkali metal supported thereon. We have found that an activated carbon such as an activated coconut charcoal and activated alumina-type adsorbents are excellent supports for alkali metals and greatly increase their catalytic activity in our alkylation process relative to the catalytic activity of the unsupported alkali metals. A suitable catalyst is a pre-formed combination of an alkali metal with the adsorbent alumina-containing material, prepared, in general, by deposition of the alkali metal upon said adsorbent within a preferred temperature range to produce a dispersion of alkali metal upon said adsorbent in which the alkali metal has, preferably, colloidal dimensions or an area just exceeding the atomic area of the alkali metal.

Suitable adsorbent alumina-containing supports comprise the activated adsorptive aluminas of commerce, which are known to be members of the gamma-alumina family, including the so-called eta-alumina (note, for example, P. J. Nahin et al., Ind. Eng. Chem. 2021 (1949); H. C. Stumpf et al., Ind. Eng. Chem. 42, 1398–1403 (1950); M. K. B. Day et al., J. Phys. Chem. 57, 946–950 (Dec. 1953); J. F. Brown et al., J. Chem. Soc. (1953, 84); argillaceous materials, particularly montmorillonitic clays and bauxite, for example, clays and clay-like materials which have heretofore been employed in the catalytic cracking of hydrocarbon oils to produce gasoline, such as the acid-treated clays (Filtrol, Superfiltrol, etc.); synthetic silica-alumina composites containing at least about 1% of alumina, for example, the calcined silica-alumina composites (which may also contain magnesia, thoria or zirconia) which have heretofore been employed in the catalytic cracking of hydrocarbon oils (note, for example, "Advances in Catalysis," vol. IV, pages 1+, especially pages 6 and 7, by R. C. Hansford, published by Academic Press, Inc., N. Y., 1952, and, in the same volume, a chapter by H. E. Ries, Jr., pages 87 and following, especially the tables at pages 93–4); and fluorided gamma-aluminas. Gamma-aluminas may be employed containing up to about 90 weight percent of oxides of metals such as titania and zirconia.

Desirable alumina-containing adsorbent materials have BET surface areas in the range of about 100 to about 700 square meters per gram, more often about 150 to 300 square meters per gram, and average pore radius of about 10 to 1000 A., usually of the order of about 25 A.

The alkali metal and supporting material can be added as discrete masses to the reaction zone, although it is preferred to pre-form the catalytic combination before use thereof in alkylation. It is believed that even when the components of the catalyst are added separately to the reaction zone, they combine therein to produce a catalyst which is a dispersion of the alkali metal upon the supporting material; it will be understood however that we are not bound by any theoretical explanations advanced herein.

The proportion of alkali metal which may be employed ranges from about 1 to about 50% by weight, based on the weight of the supporting material, more often between about 5 and about 25% by weight. Sodium may readily be dispersed as colloidal particles of 0.5 to about 1000 millimicrons on carbon or activated alumina-type adsorbents, at sodium concentrations up to about 20 to 25 weight percent, based on the weight of the adsorbent.

The dispersion of the alkali metal on the adsorbent supporting material can be effected by any known method and does not form part of the present invention. For example, the dispersion of alkali metal on the adsorbent may be effected by melting the alkali metal onto the heated adsorbent supporting material, employed in the form of a powder, in the presence of a fluidizing stream of an inert gas such as helium, which serves to maintain the supporting adsorbent particles in the form of an agitated or fluidized bed. The alkali metal may be dispersed onto the adsorbent supporting material in the absence of a fluidizing gas, while effecting agitation of the adsorbent particles by conventional mixing techniques. Another technique involves contacting a dispersion of alkali metal in a hydrocarbon medium with particles of the adsorbent supporting material. Other methods for distributing alkali metals on solid supports may also be employed, e. g. by adsorption of sodium from its ammonia solutions by activated alumina or carbon.

The catalysts of this invention are partially or wholly deactivated by oxygen, moisture, carbon dioxide, nitrogen compounds and certain sulfur compounds. Consequently, contact of the catalyst or catalyst components with air, moisture or other noxious materials named should be minimized or avoided during the preparation of the catalyst and the use thereof in the alkylation process. Before use in catalyst preparation, it is desirable to thoroughly dry and possibly to evacuate the adsorbent alumina-containing materials or activated carbon supports. The catalyst composite may be diluted with inert solid materials which have no deleterious effect upon the alkylation reaction in order to modify catalyst activity, if desired. The catalyst can be employed in various forms and sizes, e. g., as powder, granules, microspheres, broken filter cake, lumps, or shaped pellets. A convenient form in which the catalysts may be employed is as powder of about 20–200 mesh/inch size range.

The ethylene may contain inert hydrocarbons, as in refinery gas streams, for example, methane, ethane, propane, etc. However, it is preferred to employ as pure and concentrated ethylene charging stocks as it is possible to obtain.

The aromatic feed stock may be benzene or a tert-alkylbenzene such as tert-butylbenzene, tert-amylbenzene (2-methyl-2-phenylbutane), tert-hexylbenzene (3-methyl-3-phenylpentane), 3-ethyl-3-phenylpentane, and 2-phenyl-2-methylhexane. Examples of other suitable benzenoid hydrocarbon charging stocks comprising a benzene ring substituted by a tert-cycloalkyl radical are 1-methyl-1-phenylcyclopentane, 1-ethyl-1-phenylcyclopentane, 1-methyl-1-phenylcyclohexane, 1-ethyl-1-phenylcyclohexane and the like. Examples of other suitable charging stocks are 2,2-bis-phenyl-propane, 2-phenyl-2-cyclohexyl propane and the like. In the aromatic feed stock, the benzene ring may be substituted by more than one tertiary saturated hydrocarbon radical, provided that the resulting aromatic hydrocarbon is alkylatable, i. e. that it contains at least one unsubstituted nuclear carbon atom meta- or para- to said tertiary saturated hydrocarbon substituent and the positions vicinal to said meta- or para-position are not occupied by substituents, such as a tert-alkyl radical, which sterically hinder the desired alkylation reaction. Thus, para-di-tertiary butylbenzene would not be a desirable aromatic hydrocarbon feed stock for our process, whereas meta-di-tertiary butylbenzene would be. Similarly, one might employ 1-methyl-1-(meta-tert-butylphenyl)cyclohexane as the aromatic hydrocarbon charging stock.

The aromatic hydrocarbon may be employed in substantial excess with respect to ethylene in the present process, thus functioning also as a diluent. However, inert diluents such as liquid saturated hydrocarbons may be employed in proportions between about 10 and about 200 volume percent, based on the volume of aromatic hydrocarbon feed stock. Preferably, the selected diluent boils outside the range of either the aromatic feed stock or the desired alkylation products, so that it may be readily separated by fractional distillation of the mixture produced by the catalytic alkylation reaction. Suitable diluents may include n-pentane, n-hexane, iso-octane, saturated naphthas, decalin, white oils, and the like.

Various methods of operation and chemical engineering expedients are available to those skilled in the art for the practice of the present invention. Thus, various means may be employed to obtain intimate contacting of the reactants with the alkali metal catalyst which is preferably employed in a highly dispersed or in molten form, for example, various stirring devices and the like.

When the alkali metal catalyst is dispersed upon a solid support, suitable contacting of the reactants with the catalyst may be effected by preparing a slurry of the solid catalyst in the aromatic hydrocarbon charging stock and stirring the slurry while introducing ethylene above or below the surface of the liquid. In such systems of catalytic operation, continuous catalytic processing can readily be practiced. Thus, a slurry of the catalyst in the aromatic hydrocarbon charging stock may be pumped through a reaction tube or coil and the ethylene may then be introduced at various positions in said tube or coil. The tube or coil may be surrounded by a suitable temperature control jacket containing a liquid heat exchange medium. The alkylation reaction mixture discharges from the tube or coil into means for separating the catalyst, which may be recycled to the reactor, and liquid and gaseous reaction materials can then be separated by fractional distillation, thus segregating desired reaction products and unconverted feed stocks which can be recycled to the reactor. The catalyst separating means may be a settling tank, filter, centrifuge, or the like.

In another mode of operation, the aromatic feed stock containing dispersed or molten alkali metal may be introduced into a reaction zone containing a fixed bed or slurry of activated carbon or activated alumina-type adsorbent material and ethylene is simultaneously introduced into said zone to effect alkylation.

The activity of the partially spent catalysts may be increased by extracting them with hot aromatic hydrocarbon solvents, for example, xylenes, at temperatures in the range of about 100 to about 200° C. under pressure sufficient at least to maintain the liquid phase. An excess of the aromatic hydrocarbon feed stock helps to keep the catalyst in clean and active condition.

We have discovered that an activated carbon such as activated coconut charcoal possesses substantial and unexpected advantages over activated alumina and similar adsorbents for use in conjunction with alkali metals in effecting the alkylation process of our invention. In general, alkali metals supported upon an activated carbon can be successfully employed at somewhat lower temperatures than the alumina-supported metal catalysts without lowering the rate of reaction. In addition, higher conversions of the aromatic hydrocarbon charging stock to alkylate can be obtained by the use of alkali metals supported upon an activated carbon than with alkali metals supported upon activated alumina or the like. We have also noted that when an activated alumina is employed as a support for sodium or other alkali metals in our process, some conversion of the ethylene to a waxy polymer occurs; this polymer tends to fill the pores of the catalyst, thus reducing the activity of the catalyst in the alkylation reaction. Therefore, from the standpoint of minimizing temperatures, increasing alkylation reaction rates, decreasing the proportion of by-products, increasing the ultimate yield of desired alkylates and maximizing the catalyst life, we prefer to employ activated carbon supports such as activated coconut charcoal for alkali metals in our alkylation process.

The catalytic alkylation activity of the alkali metals increases with increasing atomic weight of the alkali metal. Rubidium and cesium are extremely reactive, but we do not prefer to use these metals because of their rarity and expense. Lithium is a suitable catalyst which is best used in a somewhat higher temperature range than either sodium or potassium. Thus we have found that the rate of alkylation of benzene with ethylene at a partial pressure of 1000 p. s. i. in the presence of about 1.1 weight percent of lithium, based on benzene, is relatively low at about 140° C.; however, at temperatures above about 180° C., the other reaction conditions remaining substantially unaltered, rapid alkylation is found to occur. Accordingly, we prefer to employ lithium at a temperature range of about 180° C. to about 350° C. Sodium and potassium may be used to obtain suitable alkylation rates at somewhat lower temperatures ranging upwardly from about 100° C., for example about 100 to about 300° C. or, more often, about 125° C. to about 250° C.

The following examples are supplied in order to illustrate but not necessarily to limit the process of our invention. The data of the following table were obtained through the use of a stainless steel-lined autoclave of 250 ml. capacity provided with an efficient, magnetically-actuated reciprocating stirrer, which provided satisfactory contact between the aromatic hydrocarbon, ethylene and the catalyst. The supported catalysts were pre-formed outside the reactor at the indicated temperatures from the molten alkali metal and powdered supporting material, with vigorous agitation. In each instance the autoclave was charged with the liquid aromatic hydrocarbon and catalyst under an inert gas blanket, the ethylene was introduced and the contents of the reactor were heated with stirring to the indicated temperature and maintained at said temperature for the indicated period of time. Upon completion of the reaction period, the contents of the reactor were allowed to cool to room temperature, gases were bled off through a pressure release valve and the mixture of liquid and catalyst was separated by filtration. The residues were decomposed by addition to methanol. The liquids were then fractionally distilled and in some instances were also subjected to analysis by means of infrared spectroscopy.

The data of Table 1 cover the alkylation of benzene with ethylene.

TABLE 1

*Benzene alkylation with ethylene*

| Example No. | 1 | 2 | 3 | 4 | 5 |
|---|---|---|---|---|---|
| Charge: | | | | | |
| Benzene, ml | 100 | 100 | 100 | 100 | 100 |
| Catalyst, g | a Na-Al₂O₃ | c Na-Al₂O₃ | c Na-C | e Li-C | Li—White oil |
|  | 2    10 | 2    10 | 2    10 | 1    10 | 1 g.   50 ml. |
| Conditions: | | | | | |
| Temp., °C | 140 | 140 | 75 | 220 | 220 |
| Time, hr | 6.5 | 6.5 | 22 | 17 | 17 |
| Max. press., p. s. i. g | 1,000 | 1,000 | 900 | 1,000 | 2,275 |
| Press. drop, p. s. i | 400 | 1,765 | 695+ | ---------- | 1,475 |
| Max. press. drop, p. s. i./hr | 62 | 270 | 32 | ---------- | ---------- |
| Liquid Prod. Recovered, ml | b 86 | b 98 | 120 | g 94 | h 74 |
| Benzene Recovered, ml | 68 | 57 | 48 | 68 | 30 |
| Benzene Conversion, Vol. Percent | 18 | 36 | 52 | 23 | 40 |
| Alkylate, ml | 15 | 32 | 64 | 88 | 20 |
| Vol. Percent: | | | | | |
| Ethylbenzene | 10 | trace | trace | ---------- | ---------- |
| Sec-butylbenzene | 40 | 22 | 14 | ---------- | ---------- |
| 3-Ph-3-Me-pentane | 30 | d 60 | f 78 | ---------- | ---------- |
| Bottoms | 20 | 18 | 8 | ---------- | ---------- | a Prepared at 150° C.
b Solid polyethylene also formed.
c Prepared at 250° C.
d Mass spectra consistent with this structure.
e Activated coconut charcoal used as support.
f Includes some liquid polymer.
g 2 g. solid polymer.
h 3.6 g. solid polymer.

In Examples 1 and 2 catalysts prepared by the coating of commercial activated adsorptive aluminas with molten sodium were employed. In Example 1 the alumina was coated with sodium at 150° C.; in Example 2 coating was effected at 250° C. Both examples were performed under substantially identical initial operating conditions. In each example substantial conversion of benzene to alkylated benzenes was obtained, but it will be noted that the catalyst of Example 2 was somewhat more active in that the degree of benzene conversion was greater and the initial alkylation product, viz. ethylbenzene, was further converted in very substantial proportions to secondary alkylates (sec.-butylbenzene and 3-phenyl-3-methyl-pentane) by alkylation of the alpha-carbon atom of ethylbenzene. Along with the alkylation products in Examples 1 and 2 there were produced small amounts of wax-like solid polyethylenes which were retained upon the catalyst.

In Example 3 a catalyst prepared by coating an activated coconut charcoal with molten sodium was employed and was found to be active even at the relatively low temperature of 75° C. It will be noted that in this example the alkylation process yielded predominantly 3-phenyl-3-methyl-pentane by the reaction of 3 mols of ethylene per mol of benzene.

These alkylation reactions are remarkable in that highly branched alkyl groups can be introduced into the benzene nucleus by reaction with ethylene.

Examples 4 and 5 demonstrate, respectively, the utility of a catalyst prepared by coating molten lithium on an activated coconut charcoal and the efficacy of a fine dispersion of lithium in a petroleum white oil. In each instance, substantial alkylation of the benzene was effected. It is believed that the products are predominantly ethylbenzene and sec.-butylbenzene.

TABLE 2

*t-Butylbenzene alkylation with ethylene*

| Example No. | 6 | 7 | 8 |
|---|---|---|---|
| Charge: | | | |
| t-Butylbenzene, ml. | 100 | 100 | b50 |
| Catalyst, g. | aNa-C 2 10 | aNa-C 2 10 | K 0.8 |
| Conditions: | | | |
| Temp., °C. | 130 | 140 | 170 |
| Time, hrs. | 8 | 3 | 2.5 |
| Max. press., p. s. i. g. | 1,000 | 900 | 870 |
| Press. drop, p. s. i. | 275 | 540 | 650 |
| Max. press. drop, p. s. i./hr. | 60 | 300 | |
| Liquid Prod., ml. | 89 | 90 | 44 |
| t-Butylbenzene Recovered, ml. | 73 | 68 | 32 |
| t-Butylbenzene Conversion, Vol. percent | 14 | 19 | 22 |
| Alkylate, ml. | 12 | 16 | 9 |
| Vol. percent: | | | |
| $C_{12}$ | 83 | 44 | See Text |
| $C_{14}$ | | 31 | |
| Bottoms | 17 | 25 | | a Activated coconut charcoal used as support.
b 8 g. ethylene also charged.

In Table 2 are presented the data obtained by the alkylation of t-butylbenzene with ethylene.

A sodium-activated coconut charcoal catalyst was employed in Example 6. The $C_{12}$ alkylate boiled in the range of 93 to 106° C./20 mm. of mercury, and its refractive index (20/D) ranged from 1.488 to 1.492. These characteristics indicate that it is a mixture of two isomeric ethyl-t-butylbenzenes. The purpose of the operation in Example 6 was not to maximize the yield of alkylate but to obtain a substantial yield of $C_{12}$ alkylate. This was likewise true of Example 7, which was carried out at somewhat higher temperature but shorter reaction time than Example 6. In Example 7 the $C_{12}$ alkylate (ethyl-t-butylbenzenes) boiled in the range of 100 to 110° C./20 mm. of mercury and its refractive index (20/D) ranged from 1.487 to 1.492. Thus, it was apparently identical to the $C_{12}$ alkylate of Example 6. In contrast to the results of Example 6, in Example 7 it was possible to isolate a substantial yield of $C_{14}$ alkylate. The bottoms fractions of both Examples 6 and 7 were polyethylated t-butylbenzenes.

In Example 8 potassium was successfully employed as the catalyst. The alkylate contained 1-ethyl-3-tert-butylbenzene, 1-ethyl-4-tert-butylbenzene and higher molecular weight alkylates such as 1-sec.-butyl-3-tert-butylbenzene.

EXAMPLES 9 AND 10

Fluorided gamma-aluminas were prepared by treatment of a commercial activated (gamma-) alumina with liquid hydrogen fluoride to produce catalyst supports containing 4.9 and 20 weight percent of fluorine, respectively. Sodium was dispersed on the fluorided alumina supports by mechanically stirring the powdered support (10 g.) with sodium (2 g.) at about 255° C. in a helium atmosphere. Benzene (100 cc.) was alkylated with ethylene in two runs in the presence of these catalysts (12 g.) in a 250 cc. stainless steel-lined stirring autoclave at 141° C., 5 hours and a maximum ethylene pressure of about 970 p. s. i. It was found that 30 to 40 volume percent of the benzene was converted, mainly to sec-butylbenzene, with small proportions of ethylbenzene in the alkylation products.

We have observed that in certain experiments, propylene and isobutylene will alkylate benzene at a very low rate, if at all. Thus, in the treatment of 100 ml. benzene with 40 g. propylene in the presence of a catalyst consisting of 2 grams of sodium dispersed on 10 grams of an activated coconut charcoal at 140° C. for 7 hours at a maximum pressure of 400 p. s. i. g., it appeared that propylene was merely converted to its dimer.

It appears that the surface area of the supporting material for our alkali metal catalysts is not alone the decisive factor in determining utility. Some specific surface effects of the different solid materials appear to be operating, as indicated by the following experiments. In each of the following experiments the catalyst was prepared by agitating 2 g. of sodium with 10 g. of the supporting material in an inert atmosphere at 250 to 260° C. The catalysts were then employed in the attempted alkylation of 100 ml. of benzene at 141° C. under initial ethylene pressure of 1000 p. s. i. for 19 hours in a 250 ml. stainless steel-lined stirring autoclave. No evidence of alkylation was obtained when the supporting material was powdered sodium chloride, a 93% purity commercial titanium dioxide or chemically pure titanium dioxide. In another attempt to determine the operability of a sodium chloride support, the operating temperature was raised to 200° C. without avail. Likewise, useless as supports for effecting alkylation were a commercial tabular alumina having an area of about 4 square meters per gram and a silica gel.

Although the alkylation process of our invention has been described with specific reference to certain carbocyclic benzenoid hydrocarbons, it may be applied to heterocyclic aromatic compounds having similar chemical properties as regards substitution reactions, for example, pyridine, quinoline, pyrrole, thiophene, benzothiophene and substitution derivatives of such heterocyclic aromatic compounds in which the substituent is a tertiary saturated hydrocarbon radical.

The alkylation products which can be produced by the process of the present invention are useful in a very large variety of applications, as will be appreciated by one skilled in the art of petroleum, hydrocarbon chemistry and the industrial chemistry of hydrocarbon derivatives. Thus, various of the alkylates which can be produced by the process of the present invention can be employed as high octane components of motor fuels, aviation engine fuels, jet fuels and the like; they can also be employed as starting materials for the preparation of synthetic alkaryl sulfonate wetting agents and detergents. They can be subjected to usual reactions of nuclear carbon atoms or saturated side chains of aromatic hydrocarbons such as halogenation, sulfonation, nitration, oxidation, dehydrogenation, chemical condensation, sulfurization, etc.

Having thus described our invention, what we claim is:

1. A process for the nuclear alkylation of an aromatic hydrocarbon selected from the class consisting of benzene and benzene substituted only by at least one tertiary saturated hydrocarbon radical and containing an alkylatable nuclear carbon atom, which process comprises contacting a hydrocarbon feed stock whose reactive components initially consist essentially of said aromatic hydrocarbon and ethylene with a catalyst consisting essentially of a material selected from the group consisting of alkali metals and alkali metals in conjunction with a solid supporting material selected from the class consisting of activated carbon and an activated alumina-type adsorbent, effecting said contacting under nuclear alkylation conditions, and recovering an alkylated aromatic hydrocarbon thus produced from the reaction mixture.

2. The process of claim 1 wherein said aromatic hydrocarbon is benzene.

3. The process of claim 1 wherein said aromatic hydrocarbon is benzene containing at least one tertiary saturated hydrocarbon radical and containing also an alkylatable nuclear carbon atom.

4. The process of claim 1 wherein said aromatic hydrocarbon is a tert-alkylbenzene containing an alkylatable nuclear carbon atom.

5. The process of claim 1 where said aromatic hydrocarbon is a mono-t-alkylbenzene.

6. The process of claim 1 wherein said aromatic hydrocarbon is mono-t-butylbenzene.

7. A process for the nuclear alkylation of an aromatic hydrocarbon selected from the class consisting of benzene and benzene substituted only by at least one tertiary saturated hydrocarbon radical and containing an alkylatable nuclear carbon atom, which process comprises contacting a hydrocarbon feed stock whose reactive components initially consist essentially of said aromatic hydrocarbon and ethylene with at least about 0.01 gram atom, per gram mol of said aromatic hydrocarbon, of a metal catalyst consisting essentially of a material selected from the group consisting of alkali metals and alkali metals in conjunction with a solid supporting material selected from the class consisting of activated carbon and an activated alumina-type adsorbent, effecting said contacting under suitable nuclear alkylation conditions within the temperature range of about 50° C. to about 350° C. under superatmospheric pressure for a period of time sufficient to effect substantial nuclear alkylation, and recovering an alkylated aromaitc hydrocarbon product thus produced from the reaction mixture.

8. The process of claim 7 wherein said alkali metal is lithium.

9. The process of claim 7 wherein said alkali metal is sodium.

10. The process of claim 7 wherein said alkali metal is potassium.

11. The process of claim 7 wherein said catalyst is an alkali metal supported upon an activated alumina-type adsorbent.

12. The process of claim 7 wherein said catalyst is an alkali metal supported upon an activated adsorptive alumina.

13. The process of claim 7 wherein said catalyst is an alkali metal supported upon an activated carbon.

14. The process of claim 7 wherein said catalyst is an alkali metal supported upon an activated coconut charcoal.

15. A process for the alkylation of benzene, which process comprises contacting a hydrocarbon feed stock whose reactive components initially consist essentially of benzene and ethylene with between about 0.01 and about 10 gram atoms, per gram mol of benzene, of an added metallic catalyst consisting essentially of a material selected from the group consisting of alkali metals and alkali metals in conjunction with a solid supporting material selected from the class consisting of activated carbon and an activated alumina-type adsorbent, effecting said contacting under nuclear alkylation conditions including a suitable temperature between about 50° C. and about 350° C. under an ethylene pressure of at least about 500 p. s. i. and for a period of time sufficient to effect substantial nuclear alkylation, and recovering alkylation products comprising predominantly 2-phenylbutane and 3-methyl-3-phenylpentane from the reaction mixture thus produced.

16. The process of claim 15 wherein the catalyst consists essentially of sodium supported upon an activated charcoal and the reaction temperature is between about 50° C. and about 200° C.

17. The process of claim 15 wherein the catalyst consists essentially of sodium supported upon an activated adsorbent alumina and the reaction temperature is between about 100° C. and about 250° C.

References Cited in the file of this patent

UNITED STATES PATENTS

| | | |
|---|---|---|
| 2,311,232 | Ipatieff et al. | Feb. 16, 1943 |
| 2,313,053 | De Simo et al. | Mar. 9, 1943 |
| 2,372,320 | Frey | Mar. 27, 1945 |
| 2,417,454 | Corson et al. | Mar. 18, 1947 |
| 2,448,641 | Whitman | Sept. 7, 1948 |
| 2,467,326 | Mavity | Apr. 12, 1949 |
| 2,548,803 | Little, Jr. | Apr. 10, 1951 |
| 2,721,885 | Pines et al. | Oct. 25, 1955 |